(12) United States Patent
Carr et al.

(10) Patent No.: US 7,799,874 B2
(45) Date of Patent: Sep. 21, 2010

(54) CATALYTIC COMPOSITIONS

(75) Inventors: Graham Carr, Liverpool (GB); Suzanne Howarth, Warrington (GB)

(73) Assignee: Perstorp Specialty Chemicals AB, Perstorp (SE)

( * ) Notice: Subject to any disclaimer, the term of this patent is extended or adjusted under 35 U.S.C. 154(b) by 0 days.

(21) Appl. No.: 12/411,406

(22) Filed: Mar. 26, 2009

(65) Prior Publication Data

US 2009/0182096 A1 Jul. 16, 2009

Related U.S. Application Data

(63) Continuation of application No. 11/597,547, filed as application No. PCT/EP2005/052489 on May 31, 2005, now abandoned.

(30) Foreign Application Priority Data

Jun. 1, 2004 (EP) ................... 04253252

(51) Int. Cl.
*C08G 63/91* (2006.01)
(52) U.S. Cl. .......... 525/415; 524/589; 521/155; 525/454
(58) Field of Classification Search .......... 524/589; 521/155; 525/415, 454
See application file for complete search history.

(56) References Cited

U.S. PATENT DOCUMENTS

| | | | | |
|---|---|---|---|---|
| 2,933,478 | A | * | 4/1960 | Young et al. ................ 525/418 |
| 3,509,102 | A | | 4/1970 | Horn et al. |
| 4,292,411 | A | * | 9/1981 | Jourquin et al. .............. 521/51 |
| 4,804,691 | A | | 2/1989 | English et al. |
| 5,028,667 | A | | 7/1991 | McLain et al. |
| 5,159,012 | A | | 10/1992 | Doesburg et al. |
| 5,420,235 | A | | 5/1995 | Hochberg |
| 5,574,123 | A | * | 11/1996 | Bock et al. ................... 528/45 |
| 5,587,448 | A | | 12/1996 | Engen |
| 2003/0215483 | A1 | * | 11/2003 | Kim et al. .................... 424/423 |
| 2004/0147626 | A1 | * | 7/2004 | Hohl et al. ................... 521/155 |
| 2004/0162385 | A1 | * | 8/2004 | Krebs ........................... 524/589 |

FOREIGN PATENT DOCUMENTS

| | | |
|---|---|---|
| EP | 0 997 487 | 5/2000 |
| EP | 1 403 300 | 3/2004 |
| GB | 898 060 | 6/1962 |

OTHER PUBLICATIONS

Katarzyna Gorna, et al., "Synthesis and Characterization of Biodegradable Poly (E-Caprolactone Urethane) S. I. Effect of the Polyol Molecular Weight, Catalyst, and Chain Extender on the Molecular and Physical Characteristics", Journal of Polymer Science, Part A, Polymer Chemistry, vol. 40, pp. 156-170, 2002.

B. Bogdanov, et al., "Physical Properties of Poly (Ester-Urethanes) Prepared From Different Molar Mass Polycaprolactone-Diols", Polymer, vol. 40, pp. 3171-3182, 1999.

* cited by examiner

*Primary Examiner*—James Seidleck
*Assistant Examiner*—Gregory Listvoyb
(74) *Attorney, Agent, or Firm*—Oblon, Spivak, McClelland, Maier & Neustadt, L.L.P.

(57) ABSTRACT

A polyurethane obtained by reaction between
(i) at least one homopolymer obtained by homopolymerization of ε-caprolactone, and
(ii) at least one diisocyanate,
wherein said reaction between (i) and (ii) and said homopolymerization are performed in presence of a catalyst selected from (a) a catalyst containing bismuth ethylhexanoate and ethylhexanoic acid, (b) a catalyst containing bismuth ethylhexanoate and bismuth neodecanoate, and (c) a catalyst containing zinc neodecanoate and zinc oxide.

19 Claims, No Drawings

CATALYTIC COMPOSITIONS

CROSS-REFERENCE TO RELATED APPLICATIONS

The present application is a Continuation application of U.S. application Ser. No. 11/597,547, filed Nov. 27, 2006, now pending; which is a 371 application of PCT/EP05/52489, filed May 31, 2005, and claims foreign priority to European application 04253252.3, filed Jun. 1, 2004.

FIELD OF INVENTION

The present invention is concerned with a process for the production of polyurethanes comprising reacting a polymeric lactone derivative (prepared in the presence of a catalyst selected from bismuth and zinc catalysts) with an isocyanate.

BACKGROUND OF INVENTION

Polyurethanes are a versatile group of multi-phase, segmented polymers that have excellent mechanical and elastic properties, good hardness, high abrasion and chemical resistance.

In addition to elastomers, polyurethanes can also be produced as foams (rigid and flexible), adhesives, binders, coatings, and paints. Because of their unique properties, polyurethanes have found a wide variety of applications in the automotive, furniture, construction, and foot wear industries, as seating, exterior panels, structural foam, furniture, housing for electric equipment, shoe and boot soles, and refrigerator insulation.

Generally, polyurethane block co-polymers are comprised of a low glass transition or low melting "soft" segment and a rigid "hard" segment, which often has a glassy Tg, or crystalline melting point well above room temperature. The hard segment normally includes the connection of a diisocyanate (aromatic or aliphatic) and a low-molecular-weight diol or diamine, which is a chain extender. The combination of this soft polyol segment and hard segment generally forms an $(AB)_n$ type block co-polymer. By varying the structure, molecular weight of the segments, and the ratio of the soft to the hard segments, a broad range of physical properties can be obtained.

A urethane group is formed by the reaction between an alcohol and an isocyanate group. Thus, polyurethanes result from the reaction between an alcohol with two or more hydroxy groups (diol or polyol) and an isocyanate containing two or more isocyanate groups (diisocyanate or polyisocyanate).

Organotin compounds, especially dibutyltin dilaurate, are in widespread use as catalysts for the polyurethane reaction. Organotin compounds contain at least one direct bond between the tin and carbon atoms. In recent years there has been a great deal of public attention focused on the toxicological and environmental impacts or organotins, with special concern over the use of tributyl tin (TBT) due to its biocidal properties. Since 1988 the U.S. has banned the use of paints containing organotin compounds on water vessels that are shorter than 25 meters in length. The FDA has also placed limits on organotins to 3% in plastics that contact food (U.S. FDA 21CFR 178.2650 2000). In addition to concerns about the organotin content of various plastics, there is also the issue of worker exposure to much higher levels of these compounds when plant personnel handle the pure tin-containing additives. Furthermore, organotin residues have been found in articles, for example, in clothing manufactured from polyurethane fibers, thus exposing users of such articles to a risk of poisoning.

It would be desirable to find alternatives to organotin compounds as catalysts for use in polyurethane production.

U.S. Pat. No. 5,159,012 discloses a process for the manufacture of polyurethane elastomers from a reaction mixture which comprises a polyol, an isocyanate, water and a bismuth catalyst.

U.S. Pat. No. 5,587,448 concerns a reaction system for producing a polyurethane having an isocyanate index value of at least 100, and a catalyzed reaction mixture thereof, having a gel time between 5 and 60 minutes. The reaction system includes: (a) a first part comprising a polyisocyanate component; (b) a second part comprising: (i) a polyol component; (ii) a polyurethane catalyst comprising a bismuth/zinc polyurethane catalyst; and (iii) a molar excess of a complexing agent for the polyurethane catalyst, where the complexing agent is a mercaptan compound.

U.S. Pat. No. 4,804,691 discloses the preparation of a polyurethane using a catalyst selected from stannous octoate, a zinc compound, an aliphatic tertiary amine, dibutyltin diacetate or 1,4-diazabicyclo[2,2,2]octane.

Gorna et al (*Journal of Polymer Science. Part A: Polymer Chemistry*, Vol. 40, 156-170 (2002)) has described the synthesis of poly(ε-caprolactone) urethanes using poly(ε-caprolactonediols), diisocyanates and a range of catalyst systems. These include stannous octoate, dibutyltin dilaurate, magnesium, manganese and zinc.

SUMMARY OF INVENTION

In a first aspect of the present invention, there is provided a composition comprising:
(i) at least one homo-polymer or at least one co-polymer of caprolactone; and
(ii) a catalyst comprising (a) bismuth ethylhexanoate and ethylhexanoic acid, (b) bismuth ethylhexanoate and bismuth neodecanoate, or (c) zinc neodecanoate and zinc oxide.

In a second aspect of the present invention, there is provided a process for the production of a homo-polymer or a co-polymer of caprolactone comprising polymerising a composition comprising:
(i) at least one caprolactone monomer and optionally a co-monomer; and
(ii) a catalyst comprising (a) bismuth ethylhexanoate and ethylhexanoic acid, (b) bismuth ethylhexanoate and bismuth neodecanoate, or (c) zinc neodecanoate and zinc oxide.

In a third aspect of the present invention, there is provided a process for the production of a polyurethane comprising polymerising a composition comprising:
(i) at least one homo-polymer or at least one co-polymer of caprolactone according to the second aspect of the invention;
(ii) a catalyst comprising (a) bismuth ethylhexanoate and ethylhexanoic acid, (b) bismuth ethylhexanoate and bismuth neodecanoate, or (c) zinc neodecanoate and zinc oxide;
(iii) an isocyanate; and
(iv) a chain extender or curative.

In one embodiment, the process for the production of the polyurethanes according to the present invention preferably involves two main steps. The first step is the production of a homo-polymer or a co-polymer of caprolactone in the form of a polyol. The homo-polymer or co-polymer of caprolactone shall hereinafter be referred to as the "caprolactone polyol". This caprolactone polyol may subsequently be used in the preparation of a polyurethane, as described in greater detail below.

The caprolactone polyol preferably comprises a homopolymer, co-polymer or mixture thereof, obtainable by polymerising a composition comprising caprolactone, preferably ε-caprolactone. Preferably the caprolactone polyol is produced by what is hereinafter referred to as the esterification reaction.

The second step, which may be carried out in conjunction with or separately from the first step, comprises reacting the caprolactone polyol with an isocyanate, preferably a di-isocyanate, to form a polyurethane. Preferably, the second step is carried out separately to the first step.

The process for the preparation of a polyurethane of the present invention suitably produces elastomeric polyurethane.

The process for the preparation of a polyurethane of the present invention suitably produces polyurethane block co-polymer.

DETAILED DESCRIPTION OF INVENTION

Preferably, catalyst (a) comprises 75 to 95 weight % of bismuth ethylhexanoate and 5 to 25 weight % of ethylhexanoic acid. Preferably, catalyst (a) comprises about 90 weight % of bismuth ethylhexanoate and about 10 weight % of ethylhexanoic acid.

Preferably, catalyst (b) comprises 5 to 45 weight % bismuth ethylhexanoate, 40 to 70% bismuth neodecanoate, up to 16 weight % ethylhexanoic acid and up to 30 weight % neodecanoic acid. Preferably, catalyst (b) comprises 5 to 20 weight % bismuth ethylhexanoate, 40 to 55 weight % bismuth neodecanoate, up to 16 weight % ethylhexanoic acid and up to 30 weight % neodecanoic acid.

Preferably, catalyst (c) comprises 75 to 95 weight % zinc neodecanoate and 5 to 25 weight % zinc oxide. Preferably, catalyst (c) comprises about 90 weight % zinc neodecanoate and about 10 weight % zinc oxide.

The "catalysts" used in the present invention may themselves comprise the active catalytic species or may form the active catalytic species in situ.

The Esterification Reaction

The esterification reaction preferably produces a caprolactone polyol which may be used in the polyurethane synthesis described herein.

Preferably, the caprolactone polyol is obtainable by the polymerisation of caprolactone, preferably ε-caprolactone, in the presence of a catalyst and optionally one or more co-monomers capable of forming a co-polymer with caprolactone.

The caprolactone polyol may be produced by conventional polymerisation reactions and the compositions of the present invention prepared by the addition of catalysts (a), (b) or (c). Preferably, the caprolactone polyol is produced using a catalyst comprising (a), (b) or (c) as defined above.

In a preferred embodiment of the present invention, the residual catalyst used in the production of the caprolactone polyol, or an additional catalyst, which may be the same or different to the first catalyst, may be used in the subsequent polyurethane synthesis. Preferably the same catalyst is used in both the formation of the caprolactone polyol and in the formation of the polyurethane. Zinc neodecanoate/zinc oxide is the preferred esterification catalyst.

It has surprisingly been found that the same catalyst may be used for both the formation of the caprolactone polyol and the formation of the polyurethane. It has been found that a catalyst (a), (b) or (c) as defined above, utilised in the production of the caprolactone polyol retains activity in the subsequent production of a polyurethane.

It is preferred that the caprolactone polyol comprises at least 20 wt. % caprolactone, more preferably 30 to 100 wt. % caprolactone, most preferably greater than 50 wt. % caprolactone, especially greater than 75 wt. % caprolactone.

It is preferred that the polymerisable composition used in the process for the production of the caprolactone polyol comprises at least 2 wt. % of a caprolactone monomer, more preferably 5 to 90 wt. % of a caprolactone monomer, more preferably 10 to 75 wt. % of a caprolactone monomer.

Where the caprolactone polyol is a co-polymer, the polymerisable composition used in the process for the production of the co-polymer preferably comprises at least 1 wt. % of a co-monomer, more preferably 2 to 50 wt. % of a co-monomer, more preferably 5 to 75 wt. % of a co-monomer. Co-monomers suitably include dilactide, polycarbonate, polytetrahydrofuran, butyrolactone, valerolactone, methyl valerolactone and alkyl-substituted caprolactone.

In a preferred embodiment of the present invention, a polymerization initiator may be employed in the ring-opening polymerization of ε-caprolactone. Examples of such polymerization initiator include mono-ols such as methanol, ethanol, 1-propanol, 2-propanol, butanols or phenol; diols such as ethylene glycol, 1,3-propanediol, 1,4-butanediol, neopentyl glycol, diethylene glycol, 1,5-pentanediol, 1,6-hexanediol, 1,7-heptanediol, 1,8-octanediol or 1,10-decanediol; triols such as glycerin or trimethylol propane; and tetrols such as pentaerythritol or hexols such as dipentaerythritol. Such initiators may be employed singly or as a mixture of at least two different initiators.

The molar ratio of the esterification polymerization initiator to be employed in the present invention and caprolactone can be suitably selected according to the polymerization ratio of the desired caprolactone polyol, and is normally within a range of 1:1 to 1:5,000, preferably within a range of 1:1 to 1:2,000.

The ring-opening polymerization of caprolactone may be executed by a polymerization reaction of caprolactone in the presence of the esterification catalyst and the polymerization initiator under the presence of inert gas or under a reduced pressure. The ring-opening polymerization of caprolactone is preferably executed in a nitrogen atmosphere for ease of operation.

The esterification reaction may be carried out in any suitable solvent. The solvent may comprise one or more organic solvents. Suitable organic solvents include aliphatic, alicyclic and aromatic hydrocarbon solvents such as hexane, pentane, cyclohexane, xylene benzene and toluene; ether type solvents such as diethyl ether, tetrahydrofuran, diphenyl ether, anisole and dimethoxybenzene; halogenated hydrocarbon solvents such as methylene chloride, chloroform and chlorobenzene; ketone type solvents such as acetone, methyl ethyl ketone and methyl isobutyl ketone; alcohol type solvents such as methanol, ethanol, propanol, isopropanol, n-butyl alcohol and tert-butyl alcohol; nitrile type solvents such as acetonitrile, propionitrile and benzonitrile; ester type solvents such as ethyl acetate and butyl acetate; carbonate type solvents such as ethylene carbonate and propylene carbonate; and mixtures thereof.

Suitable solvents are selected from the group consisting of aromatic hydrocarbons, aliphatic, alicyclic hydrocarbons and mixtures thereof, more preferably selected from hexane, cyclohexane, toluene and xylene. Preferably the solvent is substantially anhydrous.

The amount of catalyst used in the esterification reaction may be from 0.05 to 2000 ppm, preferably 1 to 1000 ppm (0.0001% to 0.1%) by weight based on the total weight of monomers.

As used herein, the term "caprolactone" is intended to encompass unsubstituted caprolactone and substituted caprolactone. The term "ε-caprolactone" is intended to encompass unsubstituted ε-caprolactone and substituted ε-caprolactone. Unsubstituted ε-caprolactone is particularly preferred.

As used herein, the term "caprolactone polyol" is intended to encompass homo-polymers and co-polymers obtainable by polymerisation of a composition comprising caprolactone, preferably ε-caprolactone. In particular, "caprolactone polyol" is intended to encompass a polymer obtainable by the homo- or co-polymerisation of a composition comprising ε-caprolactone. Co-polymerisation may include the co-polymerisation of caprolactone, particularly ε-caprolactone, either with a co-monomer or diluent that is not a caprolactone, or with a mixture of different caprolactones, for example, substituted and unsubstituted caprolactones or a mixture of caprolactones having different substituents.

Preferred substituted ε-caprolactone monomers that may be used in the production of the caprolactone polyols of the present invention include $C_{1-12}$ alkyl substituted ε-caprolactone, $C_{1-12}$ alkenyl substituted ε-caprolactone, $C_{1-12}$ alkynyl substituted ε-caprolactone, $C_{1-18}$ cycloalkyl substituted ε-caprolactone, $C_{1-12}$ alkoxy substituted ε-caprolactone, $C_{1-18}$ aryl substituted ε-caprolactone, $C_{1-18}$ alkaryl substituted ε-caprolactone, $C_{1-18}$ aralkyl substituted ε-caprolactone, $C_{1-18}$ aryloxy substituted ε-caprolactone and mixtures thereof.

The preferred substituted ε-caprolactone monomers that may be used in the production of the caprolactone polyols of the present invention include mono-, di- or tri-substituted monomers. For example, the preferred substituted ε-caprolactone monomers are selected from the group consisting of monomethyl ε-caprolactone, monoethyl ε-caprolactone, monopropyl ε-caprolactone, monomethoxy ε-caprolactone, monoethoxy ε-caprolactone, monopropoxy ε-caprolactone, monobenzyl ε-caprolactone, monophenyl ε-caprolactone, dimethyl ε-caprolactone, diethyl ε-caprolactone, dipropyl ε-caprolactone, dimethoxy ε-caprolactone, diethoxy ε-caprolactone, dipropoxy ε-caprolactone, dibenzyl ε-caprolactone, diphenyl ε-caprolactone and mixtures thereof.

The caprolactone polyol produced by the esterification of caprolactone preferably has a molecular weight in the range of 400 to 90000, more preferably 500 to 50000, more preferably, 540 to 5000.

The caprolactone polyol produced by the esterification reaction preferably has a polydispersity, measured by Gel Permeation Chromatography, of 1 to 2.

The esterification reaction preferably comprises the homo-polymerisation of ε-caprolactone.

The esterification reaction is preferably conducted at greater than 80° C., preferably 130-200° C. These temperature ranges have the advantages of preventing discoloration and preventing a decomposition reaction of ε-caprolactone.

The Polyurethane Synthesis Reaction

The various methods for producing polyurethanes, for example, polyurethane elastomers, can be differentiated according to the medium of preparation (for example, bulk, solution, water) and the addition sequence of the reactants (one-step process, caprolactone polyol process). Bulk polymerization, either one-step or two-step, has been the main industrial process for polyurethane production, because of its environmentally friendly solvent-free synthesis. Solution polymerization has largely been used for the laboratory or experimental synthesis of polyurethanes. Different synthetic processes have an effect on both rate and yield. For example, in some types of polyurethane bulk synthesis, the incompatibility between the reactants induces polymerization to form a heterogeneous system or the system becomes heterogeneous at a relatively early stage of the reaction. Therefore, the composition of the final product is controlled by the diffusion rate of the reactants from one phase to the other, as well as by the reaction rate between different functional groups. However, in the solution process, the problem of heterogeneity can be alleviated by the choice of solvent since incompatible reactants can be dissolved by the same solvent, thus helping to bring them into one phase.

Preferably, the polyurethane synthesis is conducted at a temperature above 20° C., preferably above 50° C., preferably above 80° C., preferably above 90° C., preferably not greater than 250° C.

Preferably, the polyurethane synthesis reaction of the present invention utilises mass polymerization. The preferred mass polymerization of the present invention may comprise a one-step or two-step process.

In a one step synthesis, the reaction is carried out by mixing a caprolactone polyol as defined above, a diisocyanate, and optionally a chain extender, together in the reaction solvent. Preferably, the solution is heated above 20° C., preferably above 50° C., preferably above 80° C., preferably above 90° C., preferably not greater than 250° C.

Preferably the polyurethane synthesis reaction process of the present invention comprises a two-step synthesis. In this process, the first step is to react the caprolactone polyol with excess diisocyanate to form a diisocyanate terminated intermediate oligomer, preferably having a molecular weight of 1000 to 5000. The oligomer that is formed is preferably a viscous liquid, or a low-melting-point solid. The second step is to convert this oligomer to the final high molecular weight polyurethane by further reaction with a diol or diamine chain extender. This step is referred to as chain-extension. Both of these steps may be achieved using the same or different catalysts, preferably the same catalyst. Preferably, both steps are carried out in the presence of zinc neodecanoate/zinc oxide.

A polyurethane made by the two-step process tends to be more regular than the corresponding polyurethane made by the one-step process. This is because the two-step process caps the caprolactone polyol as defined above with diisocyanate and then connects these oligomers with chain extender compounds. Therefore, the polymer chain has a more regular "hard-soft-hard" sequence than seen in the random distribution of hard segments in the one-step process, therefore, the hard segment size distribution tends to be narrower than in the one-step method. This structural regularity may impart desirable mechanical properties to the polyurethane since the hard segments may more easily aggregate or crystallise to form physical cross-link points.

The isocyanate reagent for the polyurethane synthesis reaction may be any isocyanate useful for forming a polyurethane. Preferred isocyanates include aliphatic, alicyclic, aromatic polyisocyanates and combinations of these compounds that have two or more isocyanate (NCO) groups per molecule, as well as their derivatives. The isocyanates may be organic, modified organic, organic polyisocyanate-terminated caprolactone polyols, and mixtures thereof.

Preferred isocyanates include substituted and unsubstituted isocyanates and isomeric mixtures, selected from the group consisting of 2,2'-, 2,4'- and 4,4'-diphenylmethane diisocyanate ("MDI"); 3,3'-dimethyl-4,4'-biphenylene diisocyanate ("TODI"); toluene diisocyanate ("TDI"); polymeric MDI; modified liquid 4,4'-diphenylmethane diisocyanate; hexamethylene-diisocyanate ("HDI"); 4,4'-dicyclohexylmethane diisocyanate ("H$_{12}$MDI"); isophorone diisocyanate ("IPDI"); para-phenylene diisocyanate ("PPDI"); meta-phenylene diisocyanate ("MPDI"); tetramethylene diisocyanate; dodecane diisocyanate; octamethylene diisocyanate; decamethylene diisocyanates; cyclobutane-1,3-diisocyanate; 1,2-, 1,3- and 1,4-cyclohexane diisocyanates; 2,4- and 2,6-methylcyclohexane diisocyanates; 4,4'- and 2,4'-dicyclohexyldiisocyanates; 1,3,5-cyclohexane triisocyanates; isocyanatomethylcyclohexane isocyanates; isocyanatoethylcyclohexane isocyanates; bis(isocyanatomethyl)-cyclohexane diisocyanates; 4,4'- and 2,4'-bis(isocyanatomethyl) dicyclohexane; isophorone diisocyanate; 2,4- and 2,6-hexahydrotoluenediisocyanate; 1,2-, 1,3- and 1,4-phenylene diisocyanates; triphenyl methane-4,4',4"-triisocyanate; naphthylene-1,5-diisocyanate; 2,4'-, 4,4'- and 2,2-biphenyl diisocyanates; polyphenyl polymethylene polyisocyanates ("PMDI"); mixtures of MDI and PMDI; mixtures of PMDI and TDI; aromatic aliphatic isocyanates such as 1,2-, 1,3- and 1,4-xylylene diisocyanates; meta-tetramethylxylene diisocyanate ("m-TMXDI"); para-tetramethylxylene diisocyanate ("p-TMXDI"); and modified polyisocyanates derived from the above-isocyanates and polyisocyanates, 2,2'-, 2,4'- and 4,4'-diphenylmethane diisocyanate and mixtures thereof. MDI is particularly preferred.

As discussed above, the polyurethane synthesis reaction is preferably carried out in the presence of a chain extender compound. Polyurethane chain extenders can be categorized into two main classes: aromatic diol and diamine, and the corresponding aliphatic diol and diamine. In general, polyurethanes extended with an aliphatic diol or diamine produce a softer material than do their aromatic initiated counterparts. Also, diamine chain extenders are much more reactive than diol chain extenders. Aromatic chain extenders have less reactivity than aliphatic chain extenders, which could be favorable in reactions that need to be highly controlled.

Preferred chain extenders are selected from the group consisting of alkane diols, dialkylene glycols, polyalkylene polyols, alkanolamines, N-alkyl dialkanolamines, (cyclo)aliphatic diamines, N,N'-dialkyl-substituted diamines, aromatic diamines and crosslinking agents, such as trihydric or tetrahydric alcohols, oligomeric polyalkylene polyols and mixtures thereof.

Branched or straight chain, saturated or unsaturated $C_{2-12}$, preferably $C_{2-6}$ alkane diols are preferred chain extender compounds. For example, preferred chain extender compounds are selected from the group consisting of ethylene glycol, propane-1,3-diol, propane-1,2-diol, butane-1,4-diol, butane-1,3-diol, butane-1,2-diol, 2-butene-1,4-diol, 2,2-dimethylpropane-1,3-diol, hexane-1,6-diol, octane-1,8-diol, decane-1,10-diol, and mixtures thereof. Alternatively, $C_{4-8}$ dialkylene glycols, for example, diethylene glycol and dipropylene glycol as well as polyoxyalkylene glycols, may be used as chain extenders.

$C_{2-12}$ alkanolamines, for example, ethanolamine, 2-aminopropanol and 3-amino-2,2-dimethyl propanol, are preferably used as chain extenders.

$C_{2-12}$ N-alkyl dialkanolamines, such as N-methyl and N-ethyl diethanolamine, are preferably used as chain extenders.

$C_{2-15}$ aliphatic and alicyclic diamines, for example, 1,2-ethylene diamine, 1,3-propylene diamine, 1,4-butylene diamine and 1,6-hexamethylene diamine, isophorone diamine, 1,4-cyclohexamethylene diamine, 4,4'-diaminodicyclohexyl methane and mixtures thereof, are preferably used as chain extenders.

N,N'-dialkyl-substituted and aromatic diamines, which can also be substituted at the aromatic radical by alkyl groups, having 1 to 20, preferably 1 to 4 carbon atoms in the N-alkyl radical, such as N,N'-diethyl, N,N'-di-sec-pentyl, N,N'-di-sec-hexyl, N,N'-di-sec-decyl and N,N'-dicyclohexyl(p- or m-) phenylene diamine; N,N'-dimethyl, N,N'-diethyl, N,N'-diisopropyl, N,N'-di-sec-butyl and N,N'-dicyclohexyl-4,4'-diaminodiphenylmethane; N,N'-di-sec-butyl benzidine, methylene bis(4-amino-3-methyl benzoate), 2,4-chloro-4,4'-diaminodiphenylmethane, 2,4- and 2,6-toluene diamine and mixtures thereof, are preferably used as chain extenders.

Dialkylene glycols are particularly preferred chain extenders for the polyurethane synthesis reaction, particularly diethylene glycol. Preferably, the dialkylene glycol is employed in excess of the stoichiometric proportion with respect to the caprolactone polyol in order to ensure that the caprolactone polyols are hydroxyl-terminated.

The polyurethane synthesis preferably uses the same catalyst as the esterification reaction. Zinc neodecanoate/zinc oxide is the preferred polyurethane catalyst.

In the polyurethane synthesis reaction, additional catalysts (a), (b) or (c) may be employed in 0.05-2000 ppm by weight, preferably 1-1000 ppm by weight based on total monomers. Additional catalyst may not be necessary as such catalysts may already be present in or associated with the caprolactone polyol. In the context of weight of catalyst, the "total monomers" includes both isocyanate monomers and the polyol of caprolactone.

Where a curative is used in the polyurethane reaction, it is suitably selected from conventional organic diamine or polyol materials. Suitable materials are either low melting solids or liquids. Specifically preferred curatives are the diamines, polyols or blends thereof having a melting point below 140° C. These diamines or polyols are conventionally used in the industry as curatives for polyurethane. The selection of a curative is generally based on reactivity needs, property needs for a specific application, process condition needs, and pot life desired. Known catalysts may be used in conjunction with the curative.

Preferred curatives can be selected from aliphatic diols, such as 1,4-butanediol (BDO), hydroquinone-bis-hydroxyethyl ether (HQEE), 1,4-cyclohexane dimethanol (CHDM), aliphatic triols, such as trimethylolpropane and aliphatic tetrols, such as the commercial product QUADROL® (BASF Corp.). Suitable aromatic diamines include, for example, 4,4'-methylene-dianiline (MDA), 2,2',5-trichloro-4,4'-methylenediamines naphthalene-1,5-diamine, ortho, meta, and para-phenylene diamines, toluene-2,4-diamine, dichlorobenzidine, and diphenylether-4,4'diamine, including their derivatives and mixtures.

Representative of the most preferred materials are aliphatic diols, such as HQEE, BDO, and CHDM, and diamines, such as 4,4'-methylene-bis (3-chloroaniline) (MBCA), 4,4'-methylene-bis(3-chloro2,6-diethylaniline) (MCDEA), diethyl toluene diamine (DETDA), tertiary butyl toluene diamine (TBTDA), dimethylthio-toluene diamine (ETHACURE® 300 from Albemarle Corporation), 1,2-bis(2-aminophenylthio)ethane (CYANACURE® from American Cyanamid Company), methylenedianiline (MDA), and methylenedianiline-sodium chloride complex (CAYTUR® 21 and CAYTUR® 31, from Crompton Corporation).

Additives may be included in the compositions used in the polyurethane synthesis reaction of the present invention and products obtainable thereby. Such additives may include pigments, stabilizers and other additives.

The pigments are not particularly restricted, and known organic pigments and/or inorganic pigments can be used. Among the suitable organic pigments are, for example, insoluble azo pigments, soluble azo pigments, copper phthalocyanine pigments and quinacridone pigments. The inorganic pigments include, for example, chromates, ferrocyanide compounds, metal oxides, sulfide selenium compounds, metallic salts (e.g., sulfate, silicate, carbonate, phosphate), metallic powder and carbon black.

The stabilizers are not particularly restricted, and known antioxidants and/or ultraviolet absorbents may be used. Among the suitable antioxidants are hindered phenols such as 2,6-di-t-butyl-p-cresol and butylhydroxyl anisole; bisphenols such as 2,2'-methylenebis(4-methyl-6-t-butylphenol); and phosphorus compounds such as triphenyl phosphite and diphenyl isodecyl phosphite. Among preferred ultraviolet absorbents are benzophenones such as 2,4-dihydro-xybenzophenone and 2-hydroxy-4-methoxybenzophenone; benzotriazoles such as 2-(2'-hydroxy-5'-methylphenyl)benzotriazole; salicylates such as phenyl salicylate; and hindered amines such as bis(2,2,6,6-tetramethyl-4-piperidyl)-sebacate.

Other additives which may be incorporated in the processes or products of the present invention include blocking inhibitor, releasing agent, thermal resistant stabilizer, flame retarder and the like.

As used herein, the term "alkyl" refers to a straight or branched saturated monovalent hydrocarbon radical, having the number of carbon atoms as indicated, optionally substituted with one or more heteroatoms in or on the carbon backbone. Preferred groups are not substituted with heteroatoms in the backbone. Preferred groups are not substituted with heteroatoms on the backbone. Where the backbone is substituted with one or more heteroatoms, substitution is preferably on the backbone. Where the backbone is substituted with one or more heteroatoms, heteroatom substituents are selected from oxygen, sulphur and halogen. Where the backbone is substituted with one or more heteroatoms, preferably there are 1, 2, 3 or 4 heteroatom substituents, preferably oxygen and/or halogen.

As used herein, the term "alkenyl" refers to a straight or branched unsaturated monovalent hydrocarbon radical, having the number of carbon atoms as indicated, optionally substituted with one or more heteroatoms in or on the carbon backbone, and the distinguishing feature of a carbon-carbon double bond. Preferred groups are not substituted with heteroatoms in the backbone. Preferred groups are not substituted with heteroatoms on the backbone. Where the backbone is substituted with one or more heteroatoms, substitution is preferably on the backbone. Where the backbone is substituted with one or more heteroatoms, heteroatom substituents are selected from oxygen, sulphur and halogen. Where the backbone is substituted with one or more heteroatoms, preferably there are 1, 2, 3 or 4 heteroatom substituents, preferably oxygen and/or halogen.

As used herein, the term "alkynyl" refers to a straight or branched unsaturated monovalent hydrocarbon radical, having the number of carbon atoms as indicated, optionally substituted with one or more heteroatoms in or on the carbon backbone, and the distinguishing feature of a carbon-carbon triple bond. Preferred groups are not substituted with heteroatoms in the backbone. Preferred groups are not substituted with heteroatoms on the backbone. Where the backbone is substituted with one or more heteroatoms, substitution is preferably on the backbone. Where the backbone is substituted with one or more heteroatoms, heteroatom substituents are selected from oxygen, sulphur and halogen. Where the backbone is substituted with one or more heteroatoms, preferably there are 1, 2, 3 or 4 heteroatom substituents, preferably oxygen and/or halogen.

As used herein, the term "cycloalkyl" refers to a cyclic saturated monovalent hydrocarbon radical, having the number of carbon atoms as indicated, optionally substituted with one or more heteroatoms in or on the carbon backbone. Preferred groups are not substituted with heteroatoms in the backbone. Preferred groups are not substituted with heteroatoms on the backbone. Where the backbone is substituted with one or more heteroatoms, substitution is preferably on the backbone. Where the backbone is substituted with one or more heteroatoms, heteroatom substituents are selected from oxygen, sulphur and halogen. Where the backbone is substituted with one or more heteroatoms, preferably there are 1, 2, 3 or 4 heteroatom substituents, preferably oxygen and/or halogen.

As used herein, the term "aryl" refers to a monovalent unsaturated aromatic carbocyclic radical having one or two rings, optionally substituted with one or more heteroatoms in or on the carbon backbone, such as phenyl, naphthyl, indanyl or biphenyl, or to a monovalent unsaturated aromatic heterocyclic radical, optionally substituted with one or more heteroatoms in or on the carbon backbone, such as quinolyl, dihydroisoxazolyl, furanyl, imidazolyl, pyridyl, phthalimido, thienyl, thiophenyl, pyrrolyl and the like. Exemplary heterocyclic radicals include pyrrolyl, imidazolyl, pyrazolyl, thiazolyl, isothiazolyl, oxazolyl, pyrrolidinyl, pyrrolinyl, imidazolidinyl, imidazolinyl, pyrazolidinyl, tetrahydrofuranyl, pyranyl, pyronyl, pyridyl, pyrazinyl, pyridazinyl, piperidyl, piperazinyl, morpholinyl, thionaphthyl, benzofuranyl, isobenzofuryl, indolyl, oxyindolyl, isoindolyl, indazolyl, indolinyl, 7-azaindolyl, isoindazolyl, benzopyranyl, coumarinyl, isocoumarinyl, quinolyl, isoquinolyl, napthridinyl, cinnolinyl, quinazolinyl, pyridopyridyl, benzoxazinyl, quinoxadinyl, chromenyl, chromanyl, isochromanyl and carbolinyl. Where the aryl group comprises more than one ring, the rings may be fused or bicyclic. Preferred groups are not substituted with heteroatoms in the backbone. Preferred groups are not substituted with heteroatoms on the backbone. Where the backbone is substituted with one or more heteroatoms, substitution is preferably on the backbone. Where the backbone is substituted with one or more heteroatoms, heteroatom substituents are selected from oxygen, sulphur and halogen. Where the backbone is substituted with one or more heteroatoms, preferably there are 1, 2, 3 or 4 heteroatom substituents, preferably oxygen and/or halogen.

As used herein, the term "alkaryl" refers to an aryl group with an alkyl substituent. Binding is through the aryl group. Such groups have the number of carbon atoms as indicated, and may be substituted with one or more heteroatoms in or on the carbon backbone. Preferred groups are not substituted with heteroatoms in the backbone. Preferred groups are not substituted with heteroatoms on the backbone. Where the backbone is substituted with one or more heteroatoms, substitution is preferably on the backbone. Where the backbone is substituted with one or more heteroatoms, heteroatom substituents are selected from oxygen, sulphur and halogen. Where the backbone is substituted with one or more heteroatoms, preferably there are 1, 2, 3 or 4 heteroatom substituents, preferably oxygen and/or halogen.

As used herein, the term "aralkyl" refers to an alkyl group with an aryl substituent. Binding is through the alkyl group. Such groups have the number of carbon atoms as indicated, and may be substituted with one or more heteroatoms in or on the carbon backbone. Preferred groups are not substituted with heteroatoms in the backbone. Preferred groups are not substituted with heteroatoms on the backbone. Where the backbone is substituted with one or more heteroatoms, substitution is preferably on the backbone. Where the backbone is substituted with one or more heteroatoms, heteroatom substituents are selected from oxygen, sulphur and halogen. Where the backbone is substituted with one or more heteroatoms, preferably there are 1, 2, 3 or 4 heteroatom substituents, preferably oxygen and/or halogen.

As used herein, the term "substituted" is contemplated to include all permissible substituents of organic compounds. In a broad aspect, the permissible substituents include acyclic and cyclic, branched and unbranched, carbocyclic and heterocyclic, aromatic and nonaromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

As used herein, the term "heteroatom" includes N, O, S, P, Si and halogen (including F, Cl, Br and I).

As used herein, the term "ethylhexanoic acid" refers to 2-ethylhexanoic acid.

As used herein, the term "bismuth ethylhexanoate" refers to the bismuth salt of 2-ethylhexanoic acid.

As used herein, the term "neodecanoic acid" refers to 2,2-dimethyloctanoic acid.

As used herein, the term "bismuth neodecanoate" refers to the bismuth salt of neodecanoic acid.

EXAMPLES

| Polyol formation | |
|---|---|
| Reagent | Weight used (g) |
| ε-caprolactone monomer | 1515.4 |
| Neopentylglycol | 84.6 |
| Zinc neodecanoate/zinc oxide | 12.8 ppm |

Method:

Monomer and chain extender having a total water content of less than 0.02% were charged to a 2 L flange flask equipped with stirrer, thermometer and nitrogen inlet. This was then heated to 120° C. and then catalyst added before heating until completion of reaction (as evidenced by GC analysis of monomer in aliquots taken).

Polyurethane Formation 256.4 g of the Capa polyol is weighed into a 1 Kg solids bottle. The sample is then warmed to about 10° C. higher than the start temperature in an oven or isomantle and then transferred to a lagged can and allowed to cool to 95° C. with occasional manual stirring.

94.8 g flake MDI is then added rapidly to the 1 Kg solids bottle containing Capa polyol and the mixture is then stirred manually. As the polyurethane is formed the viscosity increases. The mixture should be poured out into a mould before it sets (gel point). The sample is then left to harden.

| GC Analysis of residual monomer (based on calibration curve). | |
|---|---|
| 0 | 94.7125 |
| 16 | 0.4563 |

Results:

| | |
|---|---|
| Acid Value | 0.55 mg KOH |
| OHV (hydroxyl value) | 53.15 mg KOH |
| COHV (corrected OHV) | 53.7 mg KOH |
| Mol. Wt. | 2089.385 |
| Monomer content | 0.54% |
| Polydispersity | 1.233 |

The OHV is obtained from a standard titration of a solution containing a known amount of the hydroxy-terminated polyol to be measured. The COHV is the corrected or final OHV. COHV=OHV+Acid Value of polyol. OHV and COHV are normally measured in mg Potassium Hydroxide/g. Polyol molecular weight can then be calculated as follows:

MW=(56100×number of OH groups per molecule)/COHV

Therefore, for a difunctional polyol having a COHV of 56.1, MW=2000 (and conversely, a difunctional polyol having a COHV of 56.1, has a MW of 2000).

The invention claimed is:

1. A polyurethane obtained by
   (i) homopolymerising ε-caprolactone to form a caprolactone polyol
   (ii) reacting the caprolactone polyol with at least one diisocyanate to form a diisocyanate terminated intermediate oligomer, and
   (iii) converting the diisocyanate terminated intermediate oligomer into the polyurethane by further reaction with a chain extender,
   wherein
   the homopolymerisation is catalyzed by a catalyst selected from the group of catalysts consisting of (a) bismuth ethylhexanoate and ethylhexanoic acid, (b) bismuth ethylhexanoate and bismuth neodecanoate, and (c) zinc neodecanoate and zinc oxide,
   the formation of the intermediate homopolymer and the chain extension are performed in the presence of residual active catalyst in the obtained ε-caprolactone polyol homopolymer, and
   the diisocyanate terminated intermediate oligomer has an average molecular weight of from 1000 to 5000.

2. The polyurethane according to claim 1, wherein the chain extender is a diol or a diamine.

3. The polyurethane according to claim 1, wherein the catalyst is bismuth ethylhexanoate and ethylhexanoic acid,
   a percent by weight of bismuth ethylhexanoate is from 75 to 95%, and
   a percent by weight of ethyl hexanoic acid is from 5 to 25%.

4. The polyurethane according to claim 1, wherein the catalyst comprises bismuth ethylhexanoate and bismuth neodecanoate,
   a percent by weight of bismuth ethylhexanoate is from 5 to 45%, and
   a percent by weight of bismuth neodecanoate is from 40 to 70%.

5. The polyurethane according to claim 4, wherein the catalyst further comprises at least one of ethylhexanoic acid and neodecanoic acid, and wherein the ethylhexanoic acid is present in an amount of up to 16% by weight and the neodecanoic acid is present in an amount of up to 30% by weight.

6. The polyurethane according to claim 1, wherein the catalyst is zinc neodecanoate and zinc oxide,
a percent by weight of the zinc neodecanoate is from 75 to 95%, and
a percent by weight of the zinc oxide is from 5 to 25%.

7. The polyurethane according to claim 3, wherein the catalyst comprises about 90% by weight of bismuth ethylhexanoate and about 10% by weight of ethylhexanoic acid.

8. The polyurethane according to claim 4, wherein the catalyst comprises 5 to 20% by weight of bismuth ethylhexanoate and 40 to 55% by weight of bismuth neodecanoate.

9. The polyurethane according to claim 8, wherein
the catalyst further comprises at least one of ethylhexanoic acid and neodecanoic acid, the ethylhexanoic acid is present in an amount of up to 16% by weight and the neodecanoic acid is present in an amount of up to 30% by weight.

10. The polyurethane according to claim 6, wherein the catalyst comprises about 90% by weight of zinc neodecanoate and about 10% by weight of zinc oxide.

11. The polyurethane according to claim 1, wherein the formed caprolactone polyol has an average molecular weight of 540 to 5000 and a polydispersity, measured by Gel Permeation Chromatography, of at least 1 and less than 2.

12. The polyurethane according to claim 1, wherein the reaction to form the diisocyanate terminated intermediate oligomer is carried out by mixing the polyol homopolymer obtained by homopolymerisation of ε-caprolactone and the diisocyanate together in a solvent.

13. The polyurethane according to claim 1, wherein the diisocyanate terminated intermediate oligomer is formed in an excess of diisocyanate relative to the polyol homopolymer.

14. The polyurethane according to claim 1, wherein the diisocyanate is at least one selected from the group consisting of 2,2'-, 2,4'- and 4,4'-diphenylmethane diisocyanate ("MDI"); 3,3'-dimethyl-4,4'-biphenylene diisocyanate ("TODI"); a toluene diisocyanate ("TDI"); a polymeric MDI; a modified liquid 4,4'-diphenylmethane diisocyanate; hexamethylene-diisocyanate ("HDI"); 4,4'dicyclohexylmethane diisocyanate ("H$_{12}$ MDI"); isophorone diisocyanate ("IPDI"); para-phenylene diisocyanate ("PPDI"); meta-phenylene diisocyanate ("MPDI"); tetramethylene diisocyanate; dodecane diisocyanate; octamethylene diisocyanate; decamethylene diisocyanate; cyclobutane-1,3-diisocyanate; 1,2-, 1,3- and 1,4-cyclohexane diisocyanate; 2,4- and 2,6-methylcyclohexane diisocyanate; 4,4'- and 2,4'-dicyclohexyldiisocyanate; 1,3,5-cyclohexane triisocyanate; a isocyanate-methylcyclohexane isocyanate; a isocyanatoethylcyclohexane isocyanate; a bis(isocyanatomethyl)-cyclohexane diisocyanate; 4,4'- and 2,4'-bis(isocyanatomethyl) dicyclohexane; isophorone diisocyanate; 2,4- and 2,6-hexahydrotoluenediisocyanate; 1,2-, 1,3- and 1,4-phenylene diisocyanate; triphenyl methane-4,4',4"-triisocyanate; naphthylene-1,5-diisocyanate; 2,4'-, 4,4'- and 2,2-biphenyl diisocyanate; a polyphenyl polymethylene polyisocyanate ("PMDI"); meta-tetramethylxylene diisocyanate ("m-TMXDI"); para-tetramethylxylene diisocyanate ("p-TMXDI"); and a modified polyisocyanate derived from the above.

15. The polyurethane according to claim 1, wherein the chain extender is at least one chain extender selected from the group consisting of an alkane diol, a dialkylene glycol, a polyalkylene polyol, an alkanolamine, a N-alkyl dialkanolamine, a (cyclo)aliphatic diamine, a N,N'-dialkyl-substituted diamine, an aromatic diamine, a trihydric or tetrahydric alcohol and an oligomeric polyalkylene polyol.

16. The polyurethane according to claim 1, further comprising at least one additive selected from the group consisting of a pigment, an antioxidant, an ultraviolet absorber, a blocking inhibitor, a releasing agent, a thermal resistant stabilizer and a flame retardant.

17. The polyurethane according to claim 1,
wherein
the homopolymerization of ε-caprolactone to form a caprolactone polyol comprises a solvent selected from the group of solvents consisting of hexane, pentane, cyclohexane, xylene, benzene, toluene, diethyl ether, tetrahydrofuran, diphenyl ether, anisole, dimethoxybenzene, methylene chloride, chloroform, chlorobenzene, acetone, methyl ethyl ketone, methyl isobutyl ketone, methanol, ethanol, propanol, isopropanol, n-butyl alcohol, tert-butyl alcohol, acetonitrile, propionitrile, benzonitrile, ethyl acetate, butyl acetate, ethylene carbonate and propylene carbonate.

18. The polyurethane according to claim 17, wherein the solvent is anhydrous.

19. The polyurethane according to claim 1, wherein a content of the catalyst is from 0.05 to 2000 ppm by weight based on the total weight of the ε-caprolactone.

* * * * *